United States Patent [19]
Eberle

[11] 4,099,404
[45] Jul. 11, 1978

[54] AUTOMATIC AIR LEAK TESTING APPARATUS AND METHOD FOR BATTERIES

[75] Inventor: William J. Eberle, Reading, Pa.

[73] Assignee: General Battery Corporation, Reading, Pa.

[21] Appl. No.: 692,165

[22] Filed: Jun. 2, 1976

Related U.S. Application Data

[60] Division of Ser. No. 605,271, Aug. 18, 1975, Pat. No. 4,010,840, which is a continuation-in-part of Ser. No. 475,273, May 31, 1974, Pat. No. 3,938,368.

[51] Int. Cl.² .................................... G01M 3/26
[52] U.S. Cl. .................................... 73/45.2; 73/49.2; 277/166
[58] Field of Search ............... 73/41, 40, 45, 45.1, 73/45.2, 45.4, 49.2, 49.8; 193/35 A; 198/456; 209/72; 277/166

[56] References Cited

U.S. PATENT DOCUMENTS

| 2,986,262 | 5/1961 | Powers | 198/456 X |
|---|---|---|---|
| 3,043,129 | 7/1972 | King | 73/40 |
| 3,089,576 | 5/1963 | Sauer et al. | 198/456 X |
| 3,529,463 | 9/1970 | Orlando | 73/49.2 |
| 3,621,973 | 11/1971 | Carlson | 198/597 |
| 3,724,642 | 4/1973 | De Good | 193/35 A |
| 3,813,922 | 6/1974 | Oswald et al. | 73/49.2 F |
| 3,822,585 | 7/1974 | Toback | 73/49.2 F |
| 3,823,811 | 7/1974 | Brockmuller | 198/382 F |
| 3,930,401 | 1/1976 | Filler | 73/45.3 F |
| 3,938,368 | 2/1976 | Eberle | 73/45.1 |
| 3,942,704 | 3/1976 | Eberle | 52/758 N X |

Primary Examiner—Daniel M. Yasich
Attorney, Agent, or Firm—Benasutti Associates, Ltd.

[57] ABSTRACT

Containers, such as batteries, battery cases and the like, are moved along a first conveyor to a leak testing station, above which is located an assembly having means matable over the openings in the top of the container. The container is supplied with air at a given pressure, and metering means notes pressure change. If the container does not leak, the container advances from the testing station along the conveyor. If a leak is detected, a reject means ejects the container transversely from the testing station along a second conveyor, thereby isolating leaky containers for further processing.

14 Claims, 18 Drawing Figures

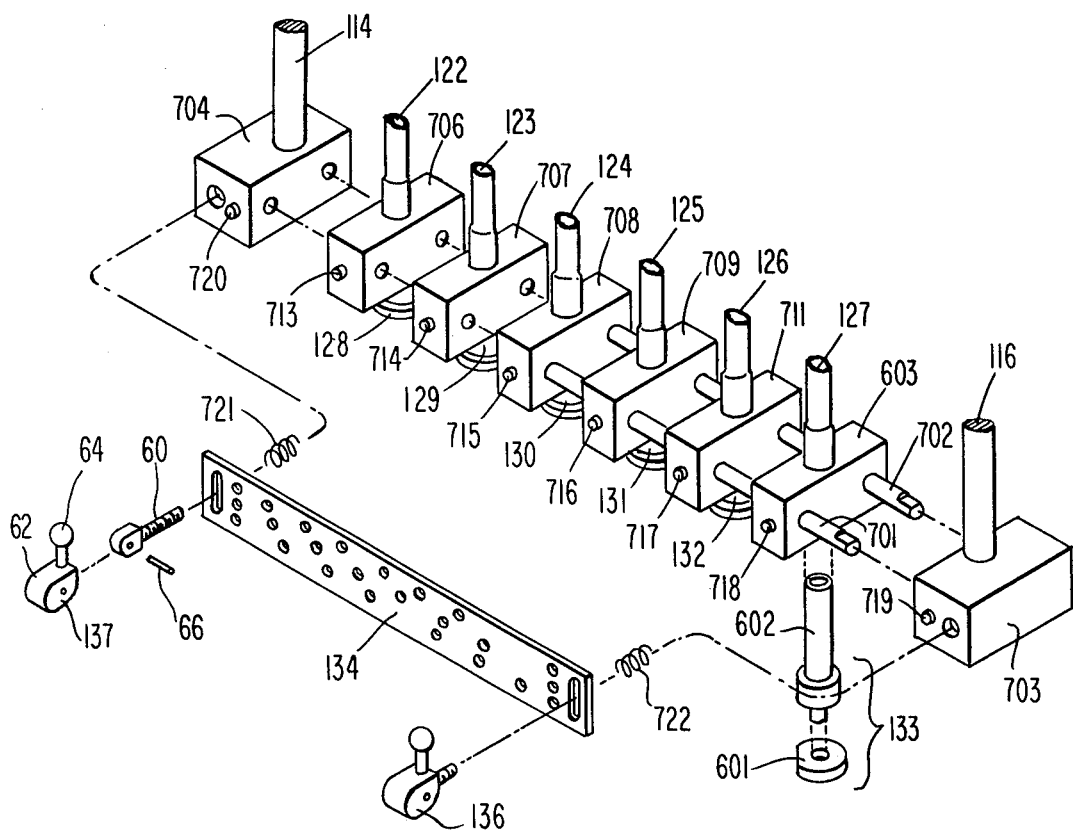
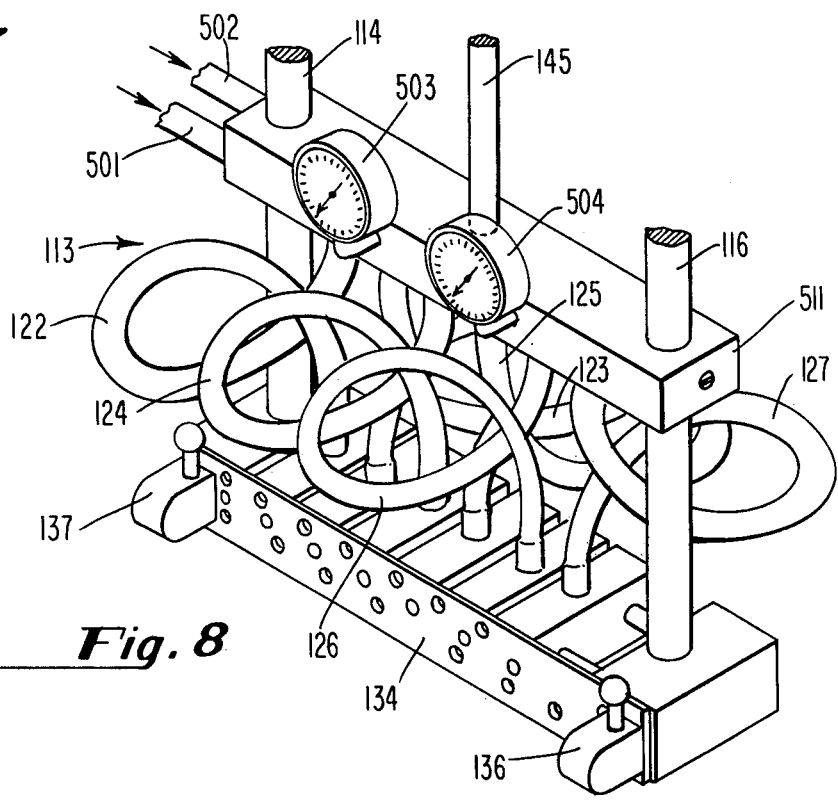

AUTOMATIC AIR LEAK TESTING APPARATUS AND METHOD FOR BATTERIES

This application is a division of my copending application Ser. No. 605,271, filed Aug. 18, 1975, now U.S. Pat. No. 4,010,840, dated Mar. 8, 1977, entitled, "Automatic Air Leak Testing Apparatus For Multiple Chambered Containers", which in turn is a continuation-in-part of my copending application Ser. No. 475,273, filed May 31, 1974, now U.S. Pat. No. 3,938,368, dated Feb. 17, 1976, entitled, "Automatic Air Leak Testing Apparatus", the disclosures of which are incorporated herein by reference.

BACKGROUND OF THE INVENTION

This invention relates to automatic leak testing apparatus, and more particularly, to such apparatus for determining the integrity of containers such as batteries, battery cases, and the individual cells in batteries.

In U.S. Pat. No. 3,822,585 issued July 9, 1974, there is shown an air leak tester designed to be applied by hand to determine whether battery cells have leaks therein. More particularly, the Toback U.S. Pat. No. 3,833,585 describes a hand operated yoke having a plurality of nozzles adjustable to fit over alternate cell inlets. Air is forced into those alternate cells and a meter notes changes of pressure which indicate air leaks. Thereafter, the remaining alternate cells are similarly tested.

In U.S. Pat. No. 3,683,676 there is schematically disclosed a fluidic detector for testing bottles for leaks. However, there is no disclosure of structural or functional adaptability to batteries, battery casings and the like.

It is accordingly a primary object of the present invention to provide substantially automatic air leak testing apparatus for use in a battery production line.

It is a further object to provide an automatic mechanism for isolating defective batteries or battery cases from the main processing or production line once defects have been detected therein.

It is a further object to provide an automatic mechanism for air testing a plurality of chambers in a battery casing.

These and other objects of the invention will become apparent from the following description with reference to the accompanying drawings.

SUMMARY OF THE INVENTION

The present invention fulfills the foregoing and other substantial functional objectives by providing an automatic air leak testing station and method of operating same in which batteries or battery cases are first positioned for testing, are automatically tested by injection of air at controlled pressure, are automatically determined to be either leaky or not, and then the leaky batteries are automatically isolated from the production line, while the others are passed on for further processing.

In an illustrative embodiment, batteries being processed are advanced along a conveyor to an air leak testing station. One battery is positioned for testing and the remainder are retained from further advancement along the conveyor. An air input assembly is matably positioned over the cell inlets of the battery, and a group of cells is pressurized with air. Associated pressure metering means determines whether an air leak has occurred in any of the pressurized cells. Depending upon whether the battery was detected as having leaks or not having leaks, it is either passed down the production line for further processing, or is isolated for further investigation.

Similar embodiments are provided for testing open battery cases.

In all of the embodiments particular structural features are present to adapt to various problems incident to the testing of batteries and battery cases. For example, it is necessary to provide special mating means depending on whether air is to be inserted through the ports of the finished battery or into the individual cells of an open battery case or into all the cells of an open battery case. These mating means must also be adaptable to different sizes of batteries. Likewise, means must be provided to retain a single battery in the test position while inhibiting further advancement of the remaining batteries and such means must accommodate various sizes of batteries.

The structural details of the foregoing illustrative embodiment, along with methods of utilizing same, will be more clearly understood upon consideration of the following drawings and detailed description thereof.

DESCRIPTION OF THE DRAWINGS

FIG. 7 is an exploded view in perspective on a greatly enlarged scale of the portion of the apparatus shown in FIG. 1.

FIG. 8 is a perspective view on a greatly enlarged scale of a portion of the apparatus shown in FIG. 1.

Figure 11:
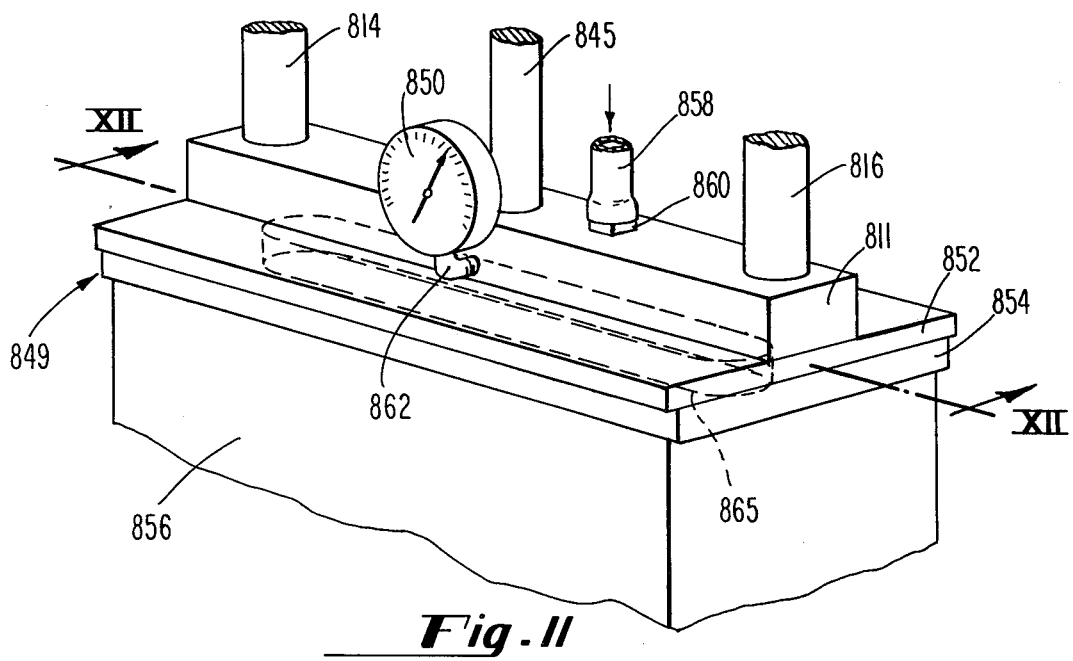
FIG. 11 is a perspective view on a greatly enlarged scale of an alternate embodiment leak testing assembly intended for use with open battery cases, one of which cases is shown partially cut away.
Figure 15:
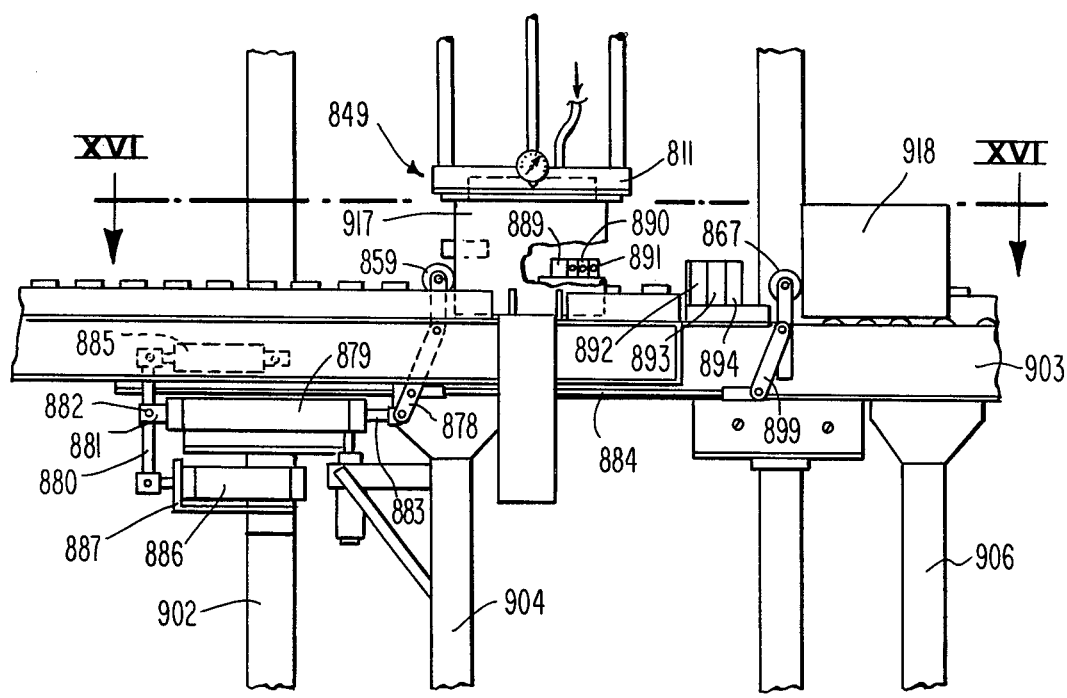

FIG. 15 is a partially cut away front elevational view of an automatic air leak testing station equipped with the leak testing assembly embodiment shown in FIG. 11 and further showing an alternate embodiment battery sensing and locating means.

Figure 16:
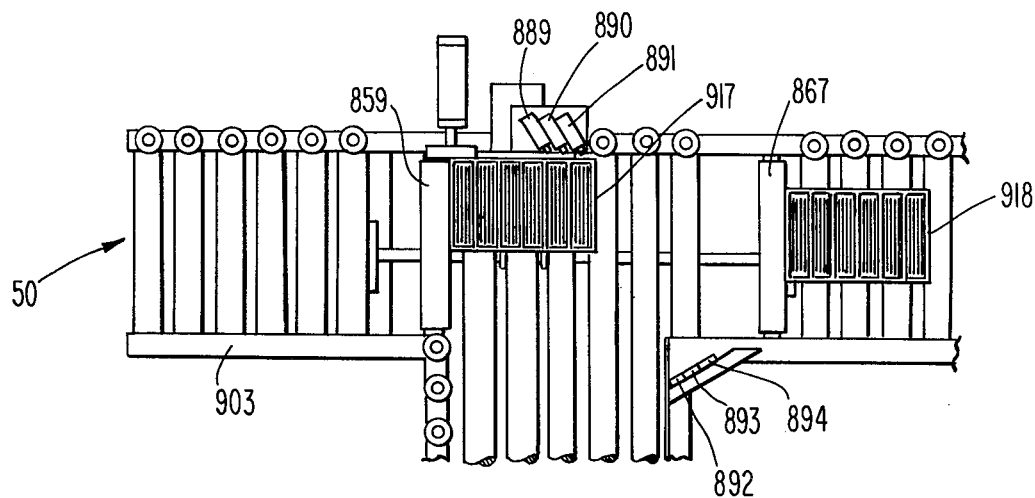

FIG. 16 is a top view of the conveyor means of the alternate embodiment shown in FIG. 15, taken as indicated by the lines and arrows XVI—XVI in FIG. 15.

Figure 17:
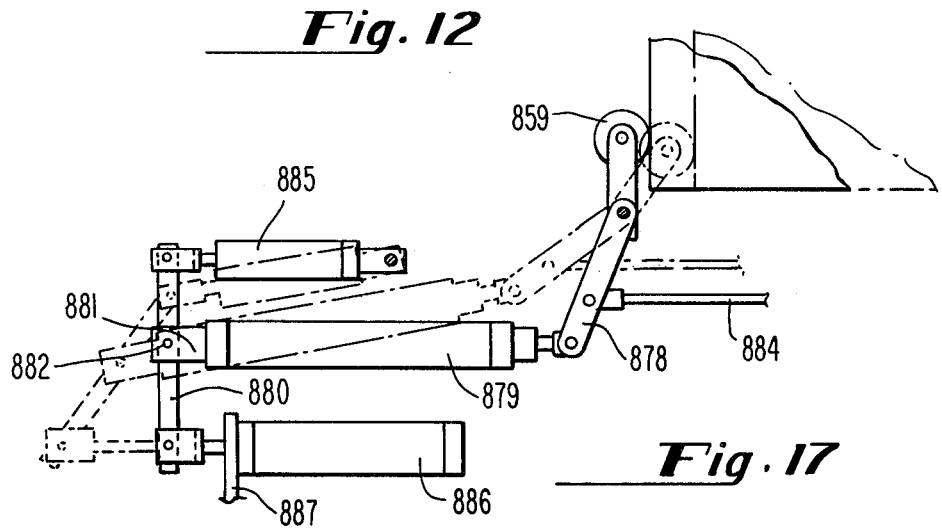

FIG. 17 is a greatly enlarged diagrammatic side view of the battery locating means of the alternate embodiment shown in FIG. 15 showing two positions of partially cut away battery cases.

Figure 18:
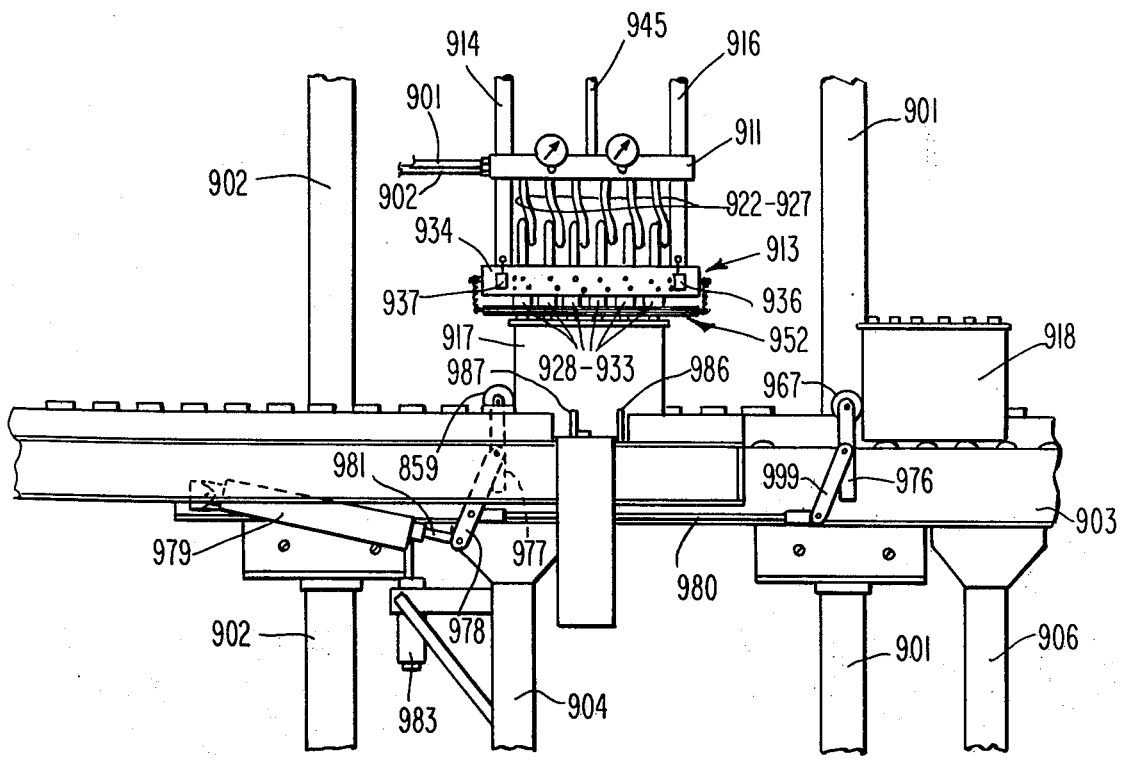
Figure 13:
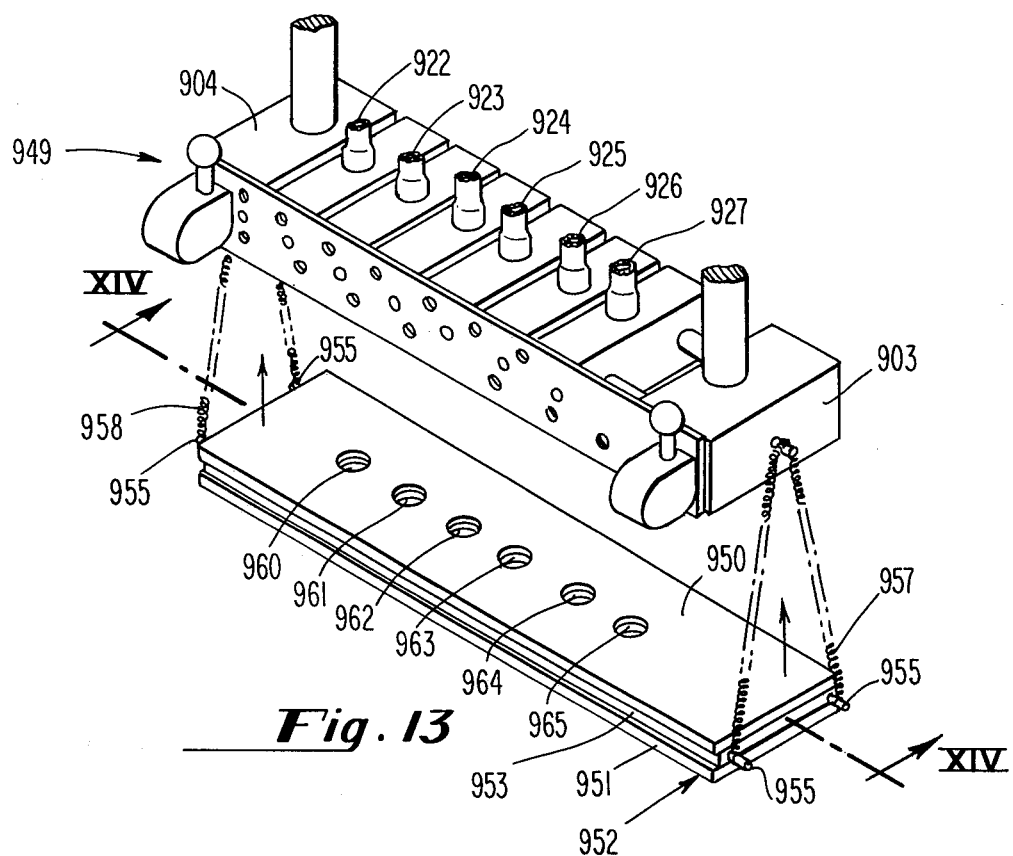
FIG. 13 is a perspective view on a greatly enlarged scale of another alternate embodiment leak testing assembly wherein a template assembly is shown exploded away from the remainder of the leak testing assembly.
Figure 14:
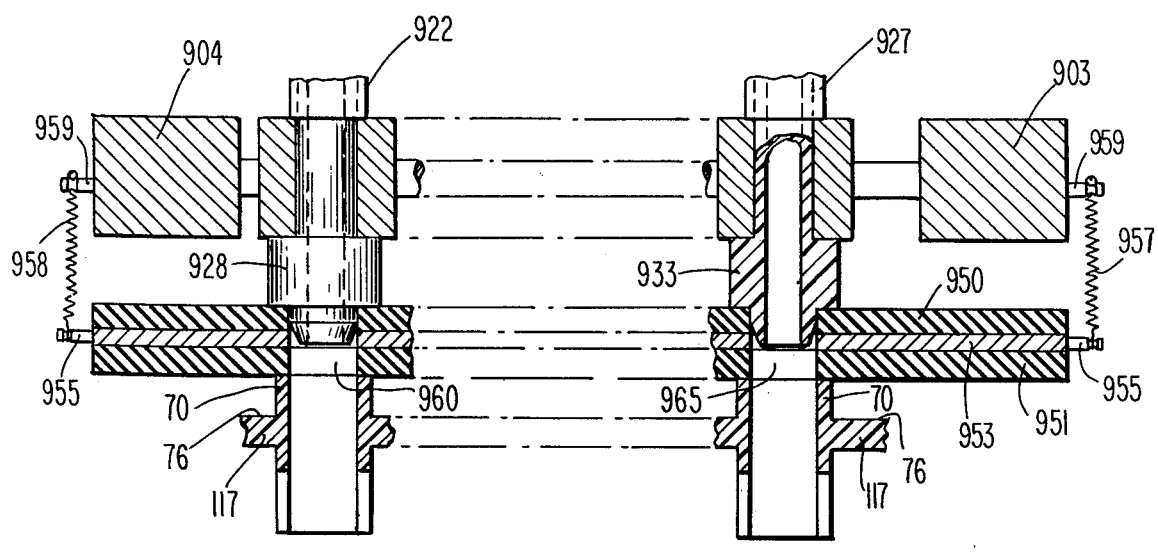
FIG. 14 is a foreshortened cross section on a greatly enlarged scale of the embodiment shown in FIG. 13 taken as indicated by the lines and arrows XIV—XIV on FIG. 13.

FIG. 18 is a partially cut away front elevational view of an automatic air leak testing station equipped with the alternate embodiment leak testing assembly illustrated in FIGS. 13 and 14.

DESCRIPTION OF THE PREFERRED EMBODIMENTS

Although specific forms of the invention have been selected for illustration in the drawings, and the following description is drawn in specific terms for the purpose of describing these forms of the invention, this description is not intended to limit the scope of the invention which is defined in the appended claims.

PARTICULAR DESCRIPTION OF APPARATUS AND METHOD FOR AIR LEAK TESTING OF COMPLETED BATTERIES

Figure 1:
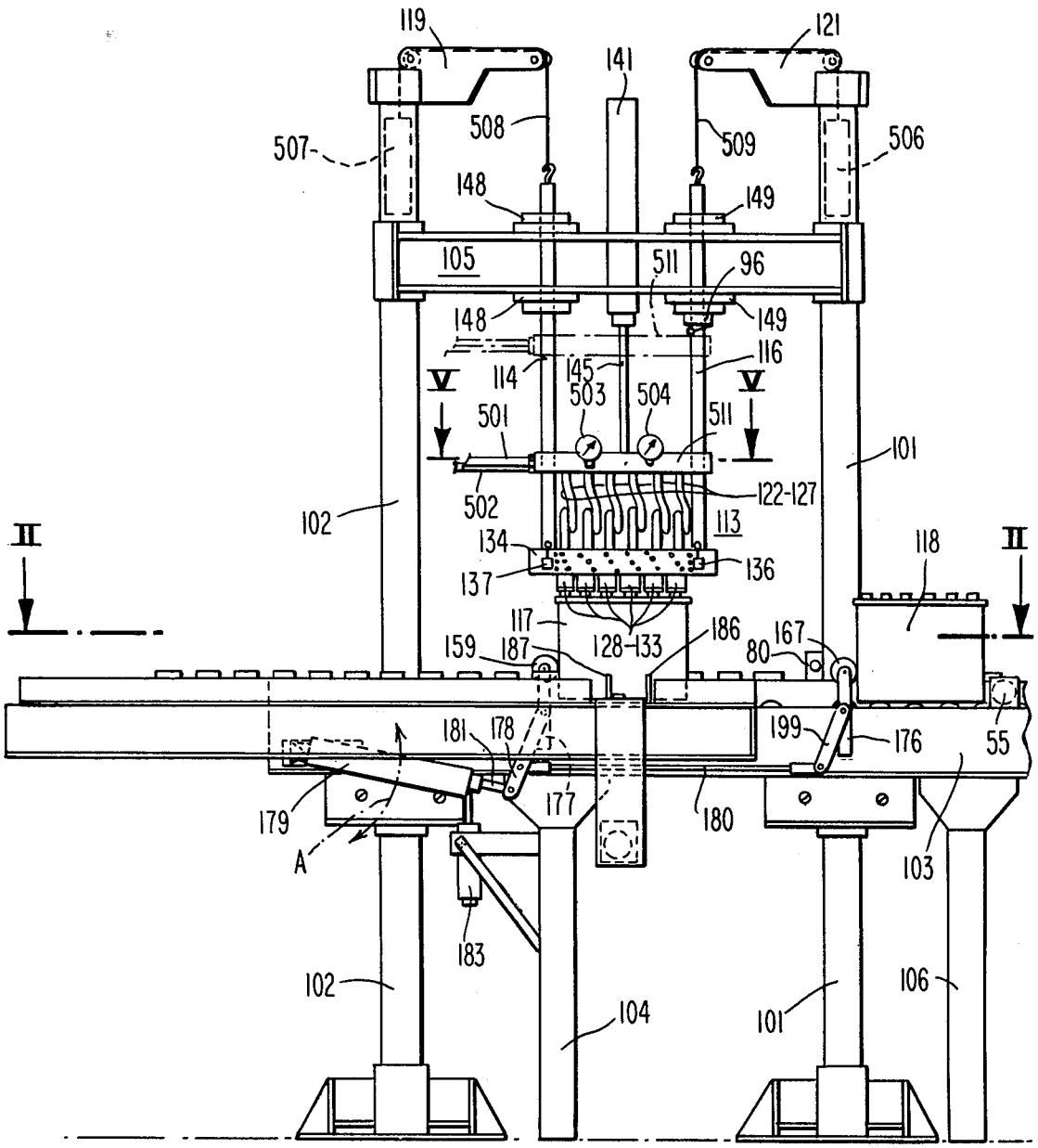
FIG. 1 is a front elevational view of an automatic air leak testing station which embodies the principles of the present invention.
Figure 2:
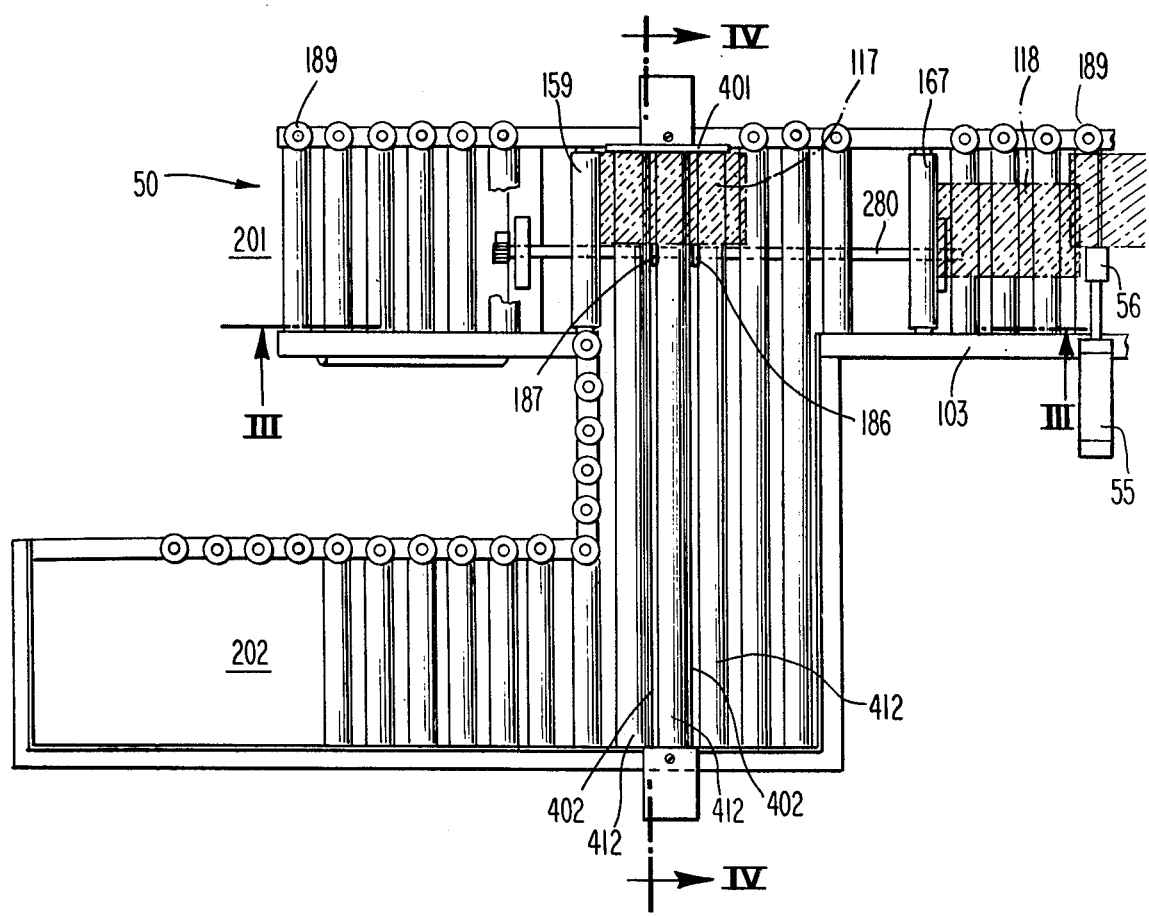
FIG. 2 is a top view of a portion of the apparatus shown in FIG. 1 taken as indicated by the lines and arrows II — II in FIG. 1.

Referring to FIGS. 1 and 2, an apparatus in accordance with this embodiment of the invention is shown. It comprises vertical support members 101 and 102 and transverse structural members connected thereto such as 105. A conveyor system includes vertical supports 104 and 106 and horizontal support 103. Batteries such as 117 and 118 are advanced along the rollers designated generally 50 in FIG. 2, which are mounted for rotation about their axes to form the conveyor. At the test station which is defined by the stop roller 159 the rollers extend transversely beyond the horizontal structural member 103 as clearly illustrated in FIG. 2. This test station is the area in which the battery is tested as shown by the shaded area illustrating where the battery 117 would be in FIG. 2. The means for positioning the battery in this area and for either advancing it along the roller conveyor to the left when viewed as in FIG. 2 or rejecting it transversely to the normal direction of advancement, axially along the surface of the long rollers, will be described in greater detail hereinafter. Mounted immediately above this test station is a testing assembly designated generally 113 in FIG. 1. The assembly 113 includes a plurality of nozzles 128 through 133 matable over the ports of a battery such as 117 and connected to air feed hoses 501 and 502 and to meters 503 and 504 by means of a corresponding plurality of conduits 122 through 127. The assembly 113 is vertically movable by means of rods 114 and 116, bearing assemblies 148 and 149, a pair of counterweights 506 and 507, and an air cylinder and piston assembly 141 and 145.

Figure 3:
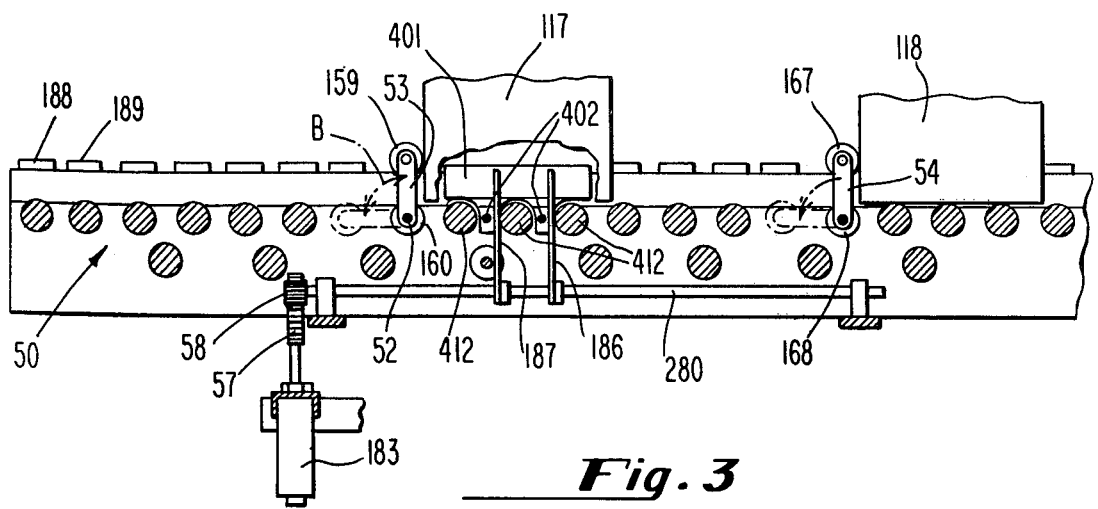
FIG. 3 is a section partially broken away of a portion of the apparatus taken as indicated by the lines and arrows III — III in FIG. 2.

As may be most clearly understood from FIGS. 1 through 3, the mechanism for positioning a battery for testing, and for precluding other batteries, such as 118, from interfering with the testing process, comprises upwardly pivotable rollers from the conveyor which serve as stop mechanisms along the conveyor. The cylinder 179 is pivotally connected at its left end when viewed as in FIG. 1 to a bracket which is fixedly mounted to the frame of the apparatus so that it can pivot in an arc as shown by the arrow A. Extending from the cylinder 179 is a piston rod 181 attached to the piston within the cylinder. The free end of the piston rod 181 is pivotally connected proximate to the end of a link 178. The other end of the link 178 is fixedly connected to a rotatable shaft which is rotatably mounted in the structural support member 103. Thus, on outward extension of the piston rod 181 the shaft will be rotated in a counterclockwise direction when viewed as in FIG. 1 and upon retraction of the rod 181 the shaft will be rotated in a clockwise direction by the link 178. As will be seen in FIG. 3, the shaft 52 (just described) has fixedly attached to it a link 53 and has mounted about it for axial rotation a roller 160 which forms a portion of the conveyor. While not shown, it will be understood that a similar link is connected to the far end of the shaft when viewed as in FIG. 3 so that the links embrace the roller 160. The other ends of the links embrace the roller 159. A shaft passes through the roller and through the links so that the roller 159 is rotatable about its axis. On appropriate movement to be described more fully hereinafter the shaft 52 will rotate the links and the roller 59 from the position shown in phantom lines to the position shown in full lines or back again as shown by the arrow B in FIG. 3.

A tie rod 180 is pivotally connected at one end intermediate the pivot points of the lever arm 178. The other end of the tie rod is pivotally connected to one end of a lever arm 199. The other end of the lever arm 199 is fixedly connected to a shaft which passes through the support member 103 and which can rotate therein. Mounted about this shaft is a roller 168 which is free to rotate about its axis and which forms a portion of the conveyor as shown in FIG. 3. A link 54 is fixedly connected to the shaft and together with another link at the other end of the roller 178 embraces the roller 168 and the roller 167 to function in the same manner upon rotation of the shaft as was previously described in connection with elements 52 and 53. Thus, under control of the cylinder 179 and extending piston rod 181, through connections of lever arms 178 and 199 and tie rod 180, rollers 159 and 167 may be pivoted upwardly and over their next adjacent rollers 160 and 168, respectively, thereby forming a stop for batteries 117 and 118 as shown. Whenever air pressure in the cylinder 179 is increased, the piston rod 181 moves outwardly, along with tie rod 180, and rollers 159 and 167 again move downwardly into the positions shown in phantom in FIG. 3; batteries 117 and 118 are then free to advance along the conveyor. However, a mechanism is provided to retard the advancement of the batteries subsequent to battery 118. Thus only one battery at a time may advance to the test station.

One such mechanism for retarding advancement is shown in FIG. 2. Therein a cylinder 55 contains a piston which has a rod extending from the cylinder and terminating in a blunt resilient mass such as a rubber stopper 56. The rod and cylinder are such that it can advance sufficiently to traverse the rollers 50 in the conveyor at least that distance necessary to force a battery against the vertically axially mounted guide rollers 189 and prevent movement of the battery. Controls are provided (not shown but well within the skill of one in the art) for actuating the piston in the cylinder 55 so that it extends the plunger 56 upon opening of the gates defined by the links and rollers 159, 167. Thus, when the gate is open the plunger is already in the extended position to prevent any battery from passing. Once the gates close, as shown in the full line position in FIG. 3, where the rollers 159 and 167 extend above the conveyor, the plunger 156 is retracted allowing the next battery in line to advance against the stop 167.

To correctly position the battery at the test station, once a battery such as 117 is in abutment with the pivoted roller 159, as shown, two fingers 186 and 187 are pivoted upwardly and between the rollers, against the battery 117, and further until the battery 117 is locked into place in a predetermined position against the horizontal portion 401 of the reject mechanism (the operation of which is detailed hereinafter). As may be seen most clearly from FIG. 3, the upward pivoting of fingers 186 and 187 occurs by means of a cylinder and piston arrangement 183. The piston rod extending from the cylinder 183 terminates in a rack gear 57 which engages a spur gear 58 fixedly connected on the end of a shaft 280. The shaft 280 is mounted in bearing blocks for rotation. The blocks are mounted to the frame of the apparatus. Intermediate to bearing blocks, the lower ends of the fingers 186, 187 are fixedly connected to the shaft 280. Thus upon rotation of this shaft about its axis the fingers will be rotated into and out of the plane of the conveyor rollers 50. The piston in the cylinder 183 which drives the rod connected to the rack gear 57 is energized by means of an appropriate control system (not shown) which is connected by an appropriate logic system (not disclosed herein but well within the skill of the art) to be actuated upon movement and in appropriate sequence of the controls and other portions of the apparatus related thereto, such as that related to the stop rollers and the reject mechanism.

Whenever the battery 117 is so positioned, the leak testing assembly, generally designated 113, may be lowered into place such that the nozzle assemblies 128 through 133 mate with the various inlet ports of the battery 117. This occurs chiefly by means of the cylinder 141 and piston 145 arrangement which is connected to the upper part of the assembly 113. In order to facilitate this operation, the assembly 113 includes upwardly extending rods 114 and 116 which are connected, by means of lines 508 and 509, respectively, to a pair of counterweights 507 and 506 located conveniently within the upper portion of vertical support members 101 and 102. In preferred embodiments, the rods 114 and 116 pass through bearing assemblies 148 and 149, and the lines 508 and 509 pass over pulleys located on cantilever support arms 119 and 121. By means of the counterweights 506 and 507, the assembly 113 may also be kept in a nearly balanced condition, such that minimal force is necessary from the cylinder 141 and piston rod 145 for either upward or downward movement.

Referring to FIGS. 5 through 8, the upper part of the assembly 113 is defined by a transverse yoke member 511 which is connected as shown to the rods 114 and 115 and the piston rod 145 from the cylinder 141. Within the yoke 511 are conduits 512 and 513 which are coupled respectively to air inlet hoses 501 and 502, and which also are connected respectively to a pair of air pressure meters 504 and 503. The conduit 513, which is supplied by air hose 502 and monitored by pressure meter 503, is coupled as shown through three supply hoses 123, 125, and 127 to the nozzles 129, 131, and 133. Likewise, the other conduit 512 is connected to the inlet hose 501, monitored by the meter 504, and coupled to the air hoses 122, 124, and 126.

As may perhaps be best appreciated from the exploded view of FIG. 7, the end blocks 703 and 704 are mounted on rods 116 and 114 respectively, which permit upward and downward movement of the various blocks 706 through 711 and 603 under control of the cylinder 141 and piston rod 145. Each of the blocks 706 through 711 and 603 is coupled at the top to one of the air supply hoses 122 through 127 by means of a sleeve type connection. Likewise, each of the blocks 706 through 711 and 603 has a passage extending from the top through the bottom and connected to the nozzles 128 through 133. Thus, when the whole assembly 113 is lowered over a battery to be tested, air from the inlet hoses 501 and 502 passes through various conduits in the yoke, downwardly through the air supply hoses 122 through 127, through the passages in the various blocks 706 through 711 and 603, and into the batteries through matable nozzles 128 through 133.

Each of the blocks 706 through 711 and 603 includes an outward protuberance 713 and 718, respectively, on an outer face thereof. Likewise, the end blocks 703 and 704 include similar protuberances 719 and 720. The blocks 706 through 711 and 603 are transversely bored in two places each to accept the longitudinally extending rods 701 and 702 upon which they are slidably mounted. The relative positioning of all of the blocks 706 through 711 and 603 on the rods 701 and 702 is established by the penetration of the protuberances 713 through 720 in appropriately spaced guide holes on an overlaying face plate 134. As may be seen from the drawing, the plate 134 includes horizontal sets of holes at various spacings, each horizontal set corresponding to a different battery inlet port configuration, that is, the battery inlet ports for different size batteries which are spaced from one another at various distances. The plate is retained against the blocks 703, 704 by means of cam fasteners 136, 137 respectively. Each cam fastener comprises a cam shaft such as 60. FIG. 7, which is threaded at one end as shown for threaded engagement with the block 704; and has at its other end a substantially cylindrical portion with opposed flat sides. There is a hole through the shaft which terminates in these flat sides. The cam body 62 has a mating slot (not visible in FIG. 7) which accepts the substantially cylindrical portion of the cam shaft and has flat surfaces to slidingly engage the flat surfaces on the cam shaft. It also has a hole through it which will line up with the hole in the cam shaft so that a pin 66 can be inserted to retain the two in pivotal relation to one another. The bottom lead surface of the cam body is curved as shown in FIG. 7 so that when the handle 64 is pulled back down and away from the plate 134 the curve portion rides in against the plate and forces the plate against the block 704. When the handle 64 is moved to the upright position as shown in FIG. 7, the springs 721, 722 move the plate 134 away from the protuberances so they can be realigned for another size battery. At the same time they hold the plate against the front faces of the cam bodies and thus aid in the realignment procedure. Accordingly, such positioning of the plate on the end blocks 703 and 704 conclusively establishes spacings of the blocks 706 through 711 and 603, and thereby of the nozzles 128 through 133. Hence, any predetermined spacings and numbers of openings in the plate 134 may be utilized to adapt the assembly 113 for testing of batteries of any size and number of cells.

Figure 6:
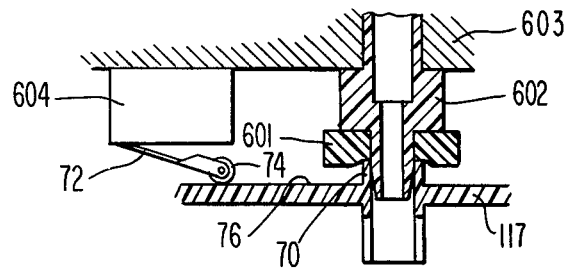
FIG. 6 is an enlarged section of a portion of the mating means utilized in this embodiment of the invention shown in mating relation with a battery inlet port shown also in section, with control means illustrated schematically.

As is most clearly shown in FIGS. 6 and 7, each of the nozzles 128 through 133 (FIGS. 1 and 7) is made up of a nozzle portion 602 which is fitted upwardly into its corresponding block, such as 603, and a gasket 601 made of some deformable material which permits an air tight connection of the assembly with the battery inlet port 70. Deformation of the gasket occurs under pressure of the whole assembly 113 when lowered onto the battery. A switch means 604 energizes introduction of gas to the cell whenever the gasket 601 is sealably mated on the inlet port 70 of the battery 117. This is accomplished by mounting the switch 604 to the movable frame portion of the testing assembly 113 in any suitable fashion so that the switch rises and falls with the frame. The switch is actuated by an arm 72 which is pivotally mounted to the switch and has a roller 74 at its free end. As the assembly 113 comes down the roller engages the top surface 76 of the battery 117 and pivots upwardly as the assembly continues to be lowered until it finally makes contact and energizes a control circuit (not shown) to actuate appropriate valving for introduction of air through the testing assembly and into the battery. The control system itself will be discussed in more detail hereinafter.

A mode of operation of the embodiment described is similar to that set forth in the foregoing patent of Toback, U.S. Pat. No. 3,822,585 wherein alternate sets of battery cells are tested simultaneously, after which the intervening alternate cells are so tested. Accordingly, once the assembly 113 is positioned against the battery top, as in FIG. 1, air is supplied through one of the inputs, such as 501, through the associated conduit, such as 512, and into the three battery cell cavities fed by hoses 122, 124, and 126 and corresponding nozzle assemblies 128, 130 and 132 (FIG. 7). When a predetermined amount of air has been introduced into the alternate cells of the battery, it can be determined by the associated meter, 504, whether that pressure remains stationary or, by means of a leak, dissipates at an undersired rate. Such pressure monitoring by the meter 504 will be used, as described hereinafter, to energize the other mechanisms to further process the battery as desired, depending upon whether the tested cells are found to be leaky or not. Thereupon, by a similar process, pressurized air is provided to the remaining cells by inlet hose 502 through the conduit 513, the hoses 123, 125 and 127, and the nozzles 129, 131 and 133. Pressure in those cells is similarly monitored by metering means 503. Once the testing process is completed, the entire assembly 133 is moved upwardly away from the battery, and, depending upon whether the battery was found to be leaky or not leaky, appropriate mechanisms are energized either to pass a battery on for further production, or to isolate leaky batteries from the processing apparatus.

Figure 4:
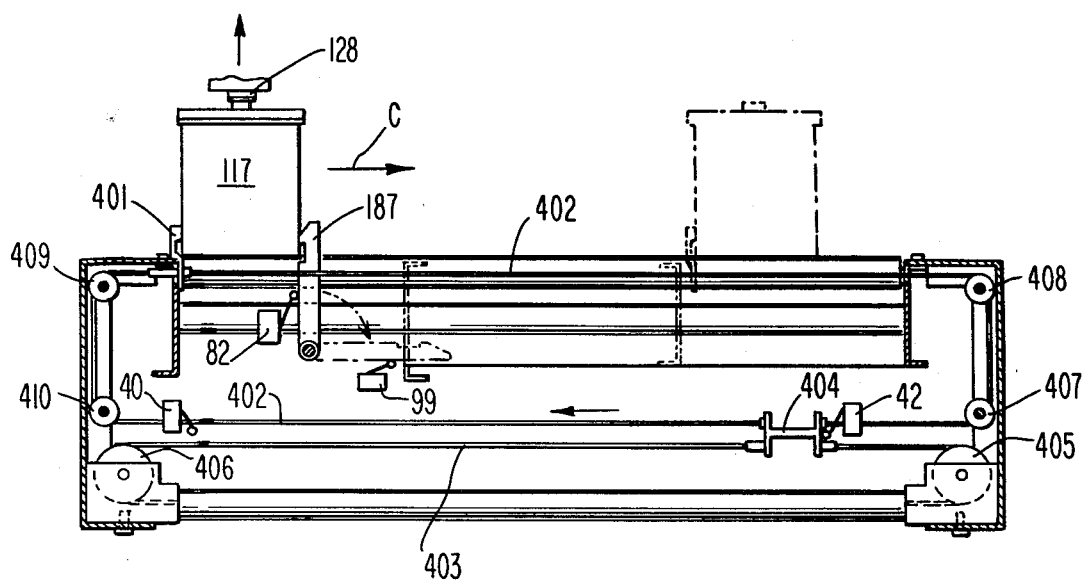
FIG. 4 is a section on a slightly enlarged scale of a portion of the apparatus taken as indicated by the lines and arrows IV — IV in FIG. 2 and showing alternate positions in phantom lines.
Figure 5:
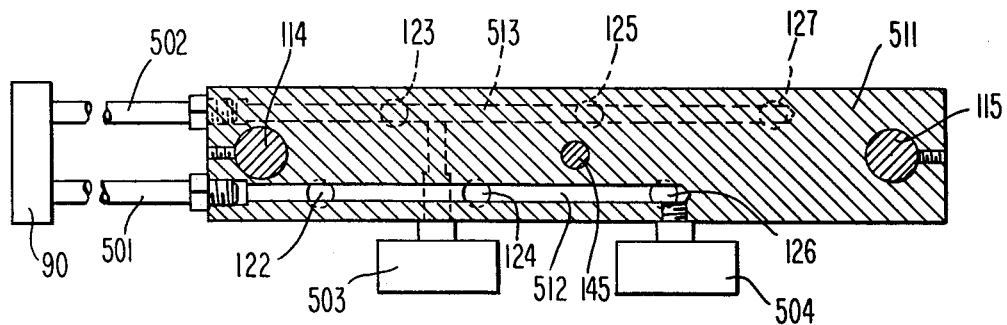
FIG. 5 is a section on a greatly enlarged scale, taken as indicated by lines and arrows V — V in FIG. 1.

FIG. 4 shows the apparatus for the isolation of the batteries. Located directly beneath the elongated rollers, such as 412, which span the two conveyor segments 201 and 202, is control apparatus for shifting batteries from one conveyor segment to the other. More particularly, beneath rollers 412 are first and second cable loops 402 and 403 which are interconnected by means of an adjustable link 404. In turn, the lower cable 403 passes over wheels 405 and 406, and the upper cable passes over pulleys 407 through 410. Fixedly mounted to the upper cable 402 by any suitable means (not shown) is a push member 401. At least one of the wheels 405 and 406 is connected by means of appropriate gear, belt, or other transmission apparatus 901 FIG. 9 to a power source 902, such that when the wheels are turned in a counterclockwise direction (when viewed as in FIG. 4), the link 404 is moved toward conveyor segment 201, and when wheels 405 and 406 are turned in a clockwise direction, link 404 is moved toward conveyor segment 202. Correspondingly, as link 404 moves the push mechanism 401 moves in the opposite direction, since the cable 402 is connected to the link 404. Thus, when the link 404 moves to the left when viewed as in FIG. 4, the push mechanism 401 moves to the right thereby moving the battery 117 from the position shown in full lines in FIG. 4, beneath the leak testing assembly 113 on the conveyor segment 201 to the second conveyor segment 202 as shown in phantom lines in FIG. 4. The fingers 186, 187 are rotated to their horizontal position shown in phantom lines in FIG. 4 prior to movement of the push member 401 to the right in the direction of the arrow C. Reversing the direction of wheels 405 and 406 reinstates the push mechanism 401 back in position to abut another battery for processing.

The mechanism shown in FIG. 4 for removing batteries from conveyor segment 201 to conveyor segment 202 serves as an automatic reject mechanism for removal of batteries ascertained to be leaky from the normal production line to a separate place, exemplified by conveyor segment 202, either for treatment as scrap, discarding, or other processing such as investigation for discovery and repair of leaks. The power mechanism 901 and 902 which turns wheels 405 and 406 and which thereby operates the push mechanism 401 is energized by detection of a leak by meters 503 or 504 after associated cells have been pressurized as described hereinbefore.

While the apparatus described may be utilized in various sequences of operation, a preferred mode is as follows. With the pivotable rollers 159 and 167 in a downward position on the conveyor segment 201, a battery advances beyond the area of upward standard 101 and is detected by sensing means, 80-FIG. 1 (such sensing means may involve a photocell receiving a light beam passing across the conveyor segment 201, mechanical means sensing passage of the battery electrical or electronic sensing systems, or other appropriate apparatus). Cylinder 179 is energized to pivot rollers 159 and 167 upwardly to the position shown in FIG. 1. A battery for testing is thereby isolated, and other batteries are held in readiness for subsequent testing by the roller 167 and the plunger 56 FIG. 2 as previously described.

Figure 10:
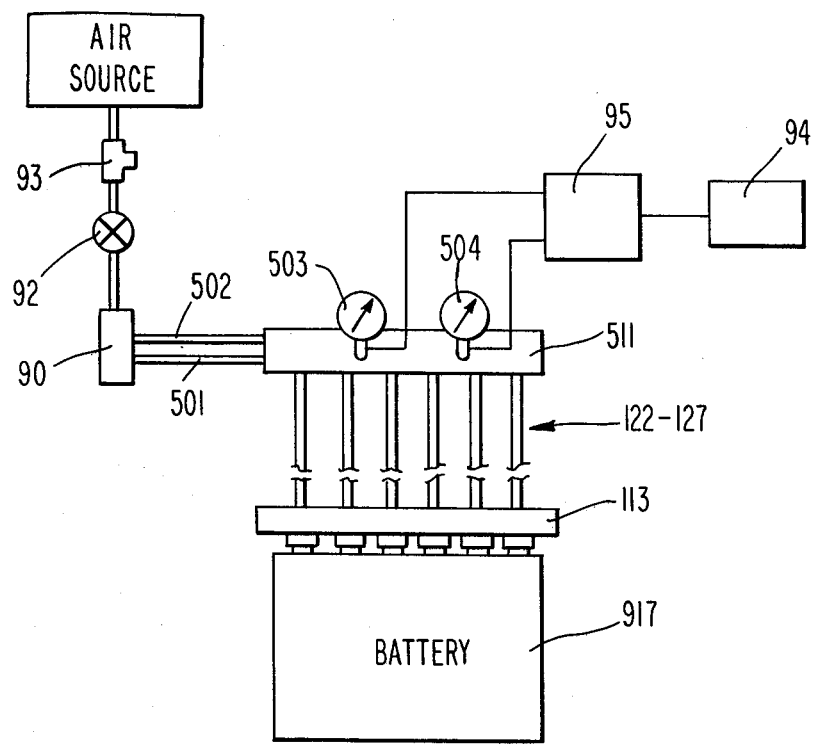
FIG. 10 is a schematic representation of the pressure testing system of the present invention.

Once the battery such as 117 is resting against upwardly pivoted roller 159, cylinder 183 is energized by other appropriate sensing mechanisms (not shown) or by a timer, activated when the rollers are raised, and by means of fingers 186 and 187, the battery is locked into place against member 401 FIG. 2, for testing. If for any reason the fingers cannot fully extend so as to force the battery completely over into place against the push plate 401, a sensing device 82, FIG. 4, activated by the position of the fingers and in particular their position when fully extended, would not function and the machine would be at rest. Thus an operator would know that there was some interference on the conveyor segment 201 which prevented the battery from being properly positioned and could correct this interference. If, however, the fingers were allowed to be fully extended and drive the battery against the push plate 401, then the sensing device would be activated to allow a predetermined controlled amount of air to enter the air cylinder 141 and drive the piston and piston rod 145 downwardly. Thereupon, the assembly 113 is automatically lowered downwardly until the nozzles 128 through 133 mate with inlet ports of the battery. The sensor 604, FIG. 6, tells the device that the battery is in position and that the nozzles have mated with the battery ports. If the battery was not in position then the roller 74 on the end of the lever arm 72 of the sensor 604 would not move the arm upwardly to close the sensing switch and therefore no contact would be made and the machine again would be at rest. In the at rest position no further action would occur until the condition was rectified. Considering, however, the condition in which a battery is in the appropriate position, cell selector valve 90, FIG. 5 (connected to the air source by any suitable means not shown), automatically moves to the open position for testing the odd numbered cells of the battery, that is, cells 1, 3 and 5, by allowing air pressure to enter the air inlet hose 501, FIG. 5. Note that the other cells are open to the atmosphere even though they are engaged with appropriate nozzles. When the pressure in cells 1, 3 and 5 reaches a proper predetermined pressure, a pressure control valve 92 FIG. 10 is actuated to discontinue supplying air under pressure to the cells. The supply of air is diverted though a four way valve 93, FIG. 10, to prevent leakage. A timer 94 then delays further operation of the apparatus until a comparator 95 compares the pressure remaining in the cells to a desired pressure usually on the order of 2 pounds. It will be noted that the comparator need not be actuated until a certain minimal amount of time has elapsed during which, if there is a leak, the air pressure will have been reduced. Depending on the size of the leak and the desired pressure standard which the battery must meet, it could be that the pressure will drop off slightly but not enough to be rejected. Thus, if the residual pressure in the battery case equals or exceeds the acceptable pressure on the other side of the diaphragm in the comparator, the battery will be accepted. If it fails to reach this pressure, the diaphragm in the comparator moves over to the other side and this signals a valve which causes the apparatus to reject the battery. If all cells are found not to be leaky, rollers 159 and 167 are pivoted downwardly to form a portion of conveyor segment 201, fingers 186 and 187 disengage from the battery, and the tested battery advances for subsequent processing, while another battery is introduced for further testing.

Partial upward movement of the testing assembly 113, while releasing the battery from engagement with the nozzles 128 through 133, will not cause the machine to further process the batteries. Thus, if only partial movement occurs the machine again will come to rest as will the general operation of the assembly line allowing the operator to note the change and correct it if possible. Full upward movement of the assembly will cause the manifold 511, FIG. 1, to engage a limit switch 96 which controls the air pressure to the control cylinders 179 and 183. Once that switch 96 is closed pressure will be fed to the air cylinders to cause the pistons to retract thereby removing the clamp fingers from engagement with the battery and opening the gates 159 and 167. The testing apparatus is now ready to accept an additional battery.

Figure 9:
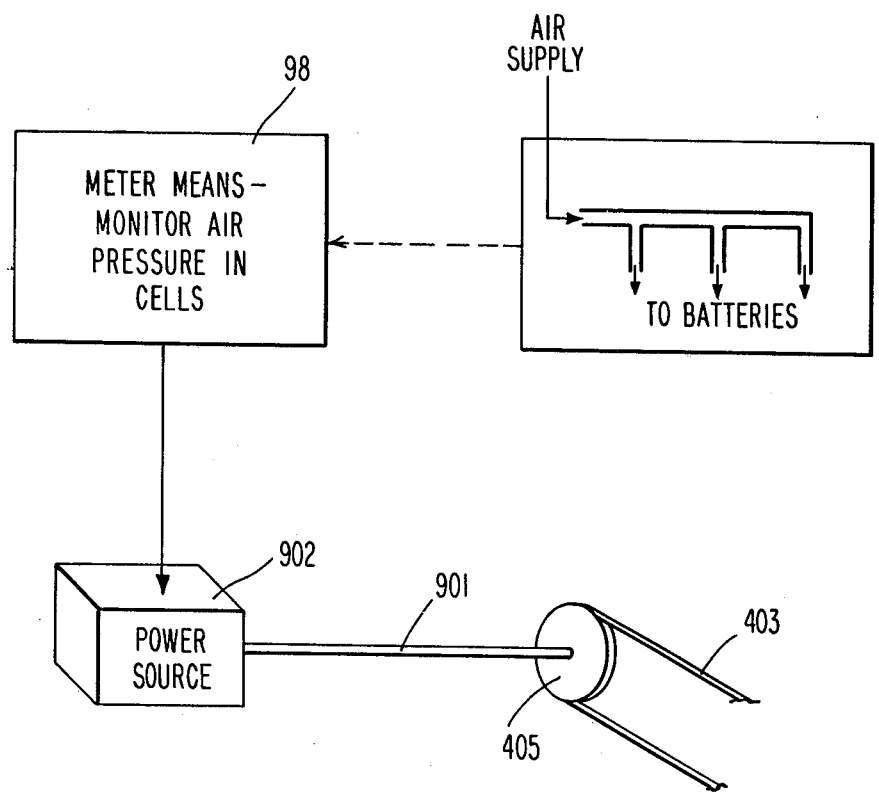
FIG. 9 is a schematic representation of a portion of the system embodied by this apparatus.

If one or more of the cells is found to be leaky, fingers 186 and 187 are pivoted donwardly, however rollers 159 and 167 remain in place since the meter means 98, FIG. 9, (which monitors the air pressure in the cells and which comprises in part the meters and the comparator 95; prevents air from being introduced into the cylinder 179 while permitting it to be introduced into the cylinder 183. Upon full retraction of the clamp fingers 186, 187 a sensor 99, FIG. 4, which is part of the monitoring system of this apparatus actuates the power source 902 to drive the member 405 and the associated cable loop 403 and move the battery to the phantom position as shown in FIG. 4 and as previously described. A limit switch 40, FIG. 4, tells the monitoring system that the battery is now in position on the second conveyor segment 202 and accordingly the monitoring means controls the power source to reverse the direction of travel of the cable loop 403 and return the push member 401 to its position against the wall of the conveyor 201. A limit switch 42, FIG. 4, tells the control system that the push member has returned to its original operative position. Pivotable rollers 159 and 167 are thereupon automatically pivoted downwardly to allow introduction of a new battery for testing, whereupon the procedure is repeated.

While in the foregoing description the exact physical description of each of the controls as well as the control circuits and monitoring means, was not supplied in detail, sufficient information was given to one skilled in the art to allow them to practice this invention. The attempt here was made to describe the properties and characteristics and inter-relationship of the controls and monitoring means and within that description modifications can be made by those skilled in the art within the scope of the invention as described and claimed.

Likewise, many other minor modifications may be made without departing from the spirit or scope of the principles of the present invention, and some apparatus may be removed or additional apparatus may be added in accordance with the abilities of those of ordinary skill in the art.

APPARATUS AND METHOD PARTICULARLY ADAPTED TO OPEN BATTERY CASINGS

The following is a description of a modification to the apparatus and method previously disclosed herein; which modification is particularly adapted to the testing of open battery cases or casings which have a plurality of cells. In various embodiments the cells may be tested in groups or in toto.

There are, of course, many potential sources of intercellular leakage between cells in a finished battery, just as there are many potential causes for leakage of battery electrolyte into the environment surrounding the finished battery. Accordingly, it is advantageous not only to check for leakage between the cells, but also to check for possible voids in the outer walls of battery cases in order to prevent the leakage of battery electrolyte out of a finished battery. This latter determination is best made after the molding of the battery case and prior to the insertion of the various battery elements into the case, for the obvious reason that testing at this time to separate defective battery cases results in substantial savings of battery parts, particularly if the battery case is not tested until after those parts have been welded in place.

Since one standard form of plastic battery case is punched with apertures between the battery cells for the purpose of making through-the-partition intercellular connections, it is not feasible at this stage in the production of the battery case to test for the integrity of each individual cell with respect to its adjacent cell. On the other hand, applicant has found that a significant number of molded battery cases are formed with undesired voids in them, particularly located in the bottom of these cases. Consequently, a great savings in time, material and effort may be accomplished if these battery cases are tested for their integrity immediately after manufacture.

Referring now to FIG. 11, one alternate embodiment leak testing assembly intended for use with open battery cases, is shown. It should be noted that during this and the following discussions relating to these alternate embodiments, unless otherwise mentioned, the elements shown in the drawings generally correspond to those elements previously described in FIGS. 1-10. For purposes of clarity in the following description, many of these elements have been renumbered with numbers which vary in the hundreds place, that is, for example, the rods 814 and 816 shown in FIG. 11 correspond to rods 114 and 116 shown in FIG. 1.

In FIG. 11, a leak test assembly designated generally 849 is shown in engagement with the top of an open battery case 856. This alternate embodiment leak test assembly, designated generally 849, may be seen to comprise a transverse yoke member 811, a plate 852 and a gum rubber pad 854. The transverse yoke member 811 may be seen to be mounted to the supporting rods 814 and 816 in the conventional manner, which yoke member 811 may be seen to be driven by the piston member 845 in a manner similar to that described above.

Figure 12:
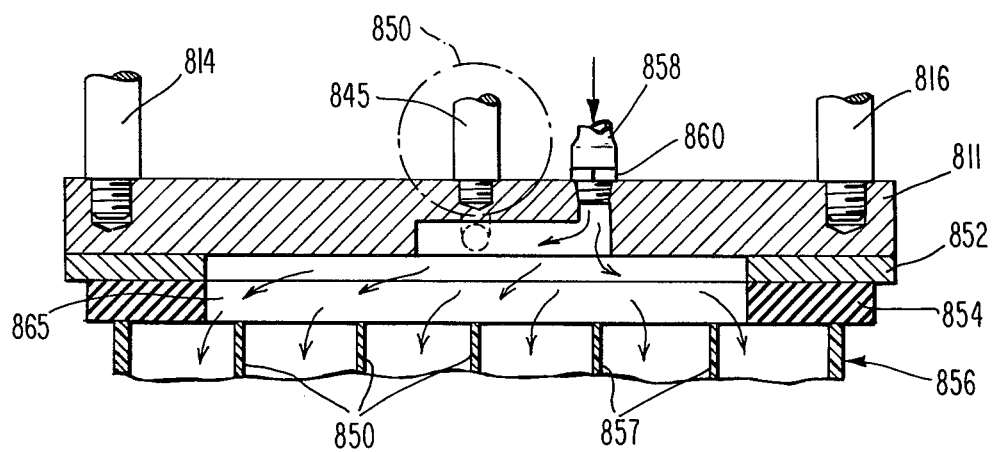
FIG. 12 is a cross section of the embodiment shown in FIG. 11 taken as indicated by the lines and arrows XII—XII, in which the relative position of the pressure gauge is shown in phantom.

Referring now to FIG. 12, which is a cross section of the embodiment shown in FIG. 11, the interrelationship between the leak testing assembly and the interior cells of the open case 856 may more clearly be seen. An air input hose 858 and air input bushing 860 may be seen to be in threaded engagement with the transverse yoke member 811 through the upper surface thereof. The hose 858 and bushing 860 may be seen to provide fluid communication between an air source (not shown in the drawings) and a yoke recess 861 which is defined by a hollowed out portion of the yoke 811, which recess is centered substantially under the piston member 845. Engaging the under-side of the transverse yoke member 811 is a steel plate 852, which is adapted to extend beyond the area defined by the vertical walls of the open case 856. The ends of the plate 852 may be seen to coterminate with the ends of the yoke 811. A fixed gum rubber pad 854 is seen to engage the undersurface of the plate 852 and is seen to have a somewhat smaller area than the plate 852. A slot 865, as seen in FIG. 11, is formed in each of the plate 852 and gum rubber pad 854, which slot is in fluid communication with the yoke recess 861, and which is of sufficient length to provide fluid communication between the yoke recess 861 and the cells formed by the case walls and the intercellular partitions 857. The battery case shown in FIG. 12 is a six-celled battery, and the slot 865 may be seen to span each of the intercellular partitions by a sufficient amount to allow air, represented by the arrows in FIGS. 11 and 12, to enter and pressurize each of the cells. The thick resilient pad 854 may be seen at FIG. 12 to be urged by the plate 852 against the walls of the case designated generally 856 in order to form an air-tight seal around the edges thereof. The operation of this embodiment of the leak testing assembly of the present invention is substantially similar to the operation described above, with the exception that the battery case need only be pressurized once, and only one determination need be made in order to determine the integrity of the case. As in the previous embodiment, a guage 850, for determining the pressure within the battery case, is attached and in fluid communications with the yoke 811 and yoke recess 861 respectively. An elbow conduit 862 is provided for this purpose.

Referring now to FIG. 15, this embodiment of the leak testing assembly, designated generally 849, may be seen in association with the remainder of an automatic air leak testing station which is similar, with certain important exceptions, to the air leak testing station of FIG. 1. Referring now to FIG. 13, showing another alternate embodiment of the leak testing assembly, designated generally 949, a novel leak testing assembly may be seen in which the reversible template assembly designated generally 952, is shown which is intended for substitution in place of the gasket 601 shown in FIG. 6. As in the embodiment shown in FIG. 6, the embodiment shown in FIG. 13 has six supply hoses, 922–927, each of which are connected through their respective blocks to nozzles, two of which are shown in FIG. 14, 928 and 933, which are intended for alignment over corresponding battery inlet ports 70. In the alternate embodiment shown in FIGS. 13 and 14, the nozzles, instead of contacting the battery inlet ports 70 by means of gaskets 601, engage and mate with corresponding holes 960-965 defined in the template, assembly designated generally 952 FIG. 12. This template assembly is generally comprised of upper and lower elastomeric plates composed of a resilient material, such as gum rubber, 950 and 951 respectively, which plates are attached to a steel or other rigid supporting plate 953 having spring pins 955 protruding from the ends thereof. The template, assembly designated generally 952, is therefore held in mating and sealing engagement with the nozzles by means of springs 957 and 958 which engage the spring pins 955 and the corresponding pins 959 disposed on the ends of blocks 903 and 904. As shown in FIG. 14, the lower elastomeric plate 951 replaces the function of the lower portion of the gasket 601, whereas the upper elastomeric plate 950 replaces the upper surface of that gasket 601 so that the forces, and therefore the wear which would normally be experienced by a gasket, such as the gasket shown in FIG. 6, will now be greatly reduced. Furthermore, the mating alignment of the holes 960–965 in the template, assembly designated generally 952, with the nozzles 928–933, tend to serve as a check on the air leak testing apparatus if the present invention is properly adjusted for the particular battery type to be processed. A further advantage of the embodiment shown in FIGS. 13 and 14 is that the characteristic wear on the particular elastomeric plates 950 and 951 can be made to be uniform in a given position, and more particularly, the wear which would be expected to be more severe on the lower elastomeric plate 951 in view of the fact that the upper elastomeric plate will be relatively rigidly affixed with respect to the various nozzles mating therewith can be equalized. Consequently, as the lower elastomeric plate begins to wear so that an efficient and effective seal is no longer consistently produced with each individual battery port, the springs may be disengaged from the spring pins 959 and the template assembly may be removed and reversed, so that the upper elastomeric plate 950 assumes the position formerly occupied by the lower elastomeric plate, and vice versa. Obviously, the quick interchange of the template assembly described herein also facilitates a rapid changeover between various different sizes of the batteries to be tested. The incorporation of this novel template, assembly designated generally 952, in an air leak testing apparatus in accordance with the present invention, is shown in FIG. 18. It should again be noted that the various elements in the apparatus shown in FIG. 18 are numbered in a nine hundred series which generally corresponds to the one hundred series reference numbers of elements shown in FIG. 1. With the exception of the novel features of the template assembly, designated generally 952, discussed above, the operation of the apparatus shown in FIG. 18 is substantially identical to that of the apparatus shown in FIG. 1.

Referring now to FIGS. 15–17, an alternate embodiment of the present invention is shown incorporating certain advancements relating to the conveyor system and battery positioning mechanism of the apparatus of the present invention. In particular, a conveyor system including vertical supports 904 and 906 and horizontal support 903 is provided. Batteries, such as 917 and 918, are advanced along rollers designated generally 50 in FIG. 16, which are mounted for rotation about their axes to form the conveyor. At the test station which is defined by the stop roller 859, the rollers extend transversely beyond the horizontal structural member 903, as clearly illustrated in FIG. 16. This test station is the area in which the battery is tested, as shown by the shaded area illustrated where the battery 917 would be in FIG. 16. The means employed in this area for either advancing it along the conveyor to the left, when viewed in FIG. 16, or rejecting it transversely to the normal direction of advancement, axially along the surface of the long rollers, is substantially similar to the mechanism described above in reference to the apparatus shown in FIGS. 1–10. Mounted immediately above this test station is a testing assembly designated generally 849 in FIG. 15. The assembly 849 shown in FIG. 15 is that previously described with reference to FIGS. 11 and 12, which assembly is intended for use with open topped battery cases, such as 917 and 918 shown in FIG. 15.

The mechanism for positioning a battery or battery case for testing, and for precluding other batteries or other battery cases, such as 918, from interfering with the testing process, comprises upwardly pivotal rollers from the conveyor which serve as stop mechanisms along the conveyor. The cylinder 879 is pivotally connected at its left end when viewed in FIG. 15 to a yoke 880 by means of a mounting projection 881 and pivot pin 882. The cylinder 879 is a double acting cylinder having a piston rod 883 attached to the piston within the cylinder. The free end of the piston rod 883 is pivotally connected proximate to the end of a link 878. The other end of the link 878 is fixedly connected to a rotatable shaft which is rotatably mounted in the structural support member 103. Thus, on onward extension of the piston rod 883 the shaft will be rotated in a counterclockwise direction when viewed as in FIG. 15, and upon retraction of the rod 883 the shaft will be rotated in a clockwise direction by the link 878. A tie rod 884 is pivotally connected at one end intermediate to pivot points of the lever arm 878 and the other end of the tie rod is pivotally connected to one end of a lever arm 899. The other end of the lever arm 899 is fixedly connected to a shaft which passes through the support member 903 and which can rotate therein. Mounted about this shaft is a roller which is free to rotate about its axis and which forms a portion of the conveyor, as shown in FIG. 16. Thus, under control of the cylinder 879 and extending piston rod 883, through connections of lever arms 878 and 899 and tie rod 884, rollers 859 and 867 may be pivoted upwardly and over the next adjacent rollers, respectively, thereby forming a stop for batteries and/or battery cases as shown.

Referring again to the left end of cylinder 879, it may be seen that each end of the yoke 880 is connected to second and third cylinders 885 and 886 respectively. The cylinder rods of the second and third cylinders may be seen to be connected pivotally to the yoke 880. Third cylinder 886 is slightly smaller than first cylinder 879, whereas second cylinder 885, which is pivotally connected to the horizontal support member 903, is slightly smaller than third cylinder 886. As shown in FIG. 15, third cylinder 886 is rigidly mounted to vertical support member 902 by means of an angle bracket 887 attached to the third cylinder at one end and to the vertical supporting member 802 at the other end.

Referring now to FIG. 17, the operation of the various cylinders in automatically locating the batteries or battery cases to be processed with respect to the testing assembly, is clearly illustrated. Depending upon the activation of the various cylinders, numerous battery sizes may be processed by the test assembly 849 without making any adjustments whatsoever to the apparatus. Furthermore, the embodiment shown in FIGS. 15–17 may process open battery cases in a mixed production line wherein the various cases fed into the conveyor represent a random assortment of various battery sizes. This mechanism for precisely centering the battery cases under the test assembly 849 functions as follows: Each battery case is introduced into the position shown for case 917 in FIG. 16 until it rests firmly against roller 859. Depending upon the size of the battery case to be processed, one or more of the photoelectric means 889–891, which normally reflect off mirrors 892–894, will be interfered with. It is understood that, while only three photoelectric sensing means are shown for purposes of illustration, any number of such means may be used in connection with a plurality of cylinders and cylinder combinations in order to determine the longitudinal dimension of the battery so as to accomplish the locating process described herein. For purposes of illustration, therefore, when, as in FIG. 16, a battery case 917 interferes with all three of the photoelectric sensing means 889–891, no adjustment in the positioning of the battery case 917 with respect to the test assembly 849 is necessary. Consequently, the cylinders 885, 886 and 879 remain in the position shown in solid lines in FIG. 17. Alternatively, when a battery somewhat smaller than the battery 917 shown in FIG. 16 is stopped by roller 859, only two of the three photoelectric sensing means are interfered with and the mechanism would then activate cylinder 886, to extend the lower portion of yoke 880, thereby moving cylinder 879 to the left as seen in FIG. 17, which in turn moves roller 859 slightly to the right, thereby precisely positioning a somewhat smaller battery directly under the center of test assembly 849, as shown in phantom.

Similarly, when an even smaller battery comes to rest against roller 859, only photoelectric sensing means 889 will be interfered with and cylinders controlled by photoelectric sensing means 890 and 891 would both extend to a position wherein roller 859 would stop the smaller battery even further to the right than the roller position shown in phantom in FIG. 17. As shown in FIG. 16, the photoelectric sensing means are placed at an angle with respect to the longitudinal axis of the conveyor so that the light which is emitted therefrom will not be directly reflected back from the surface of a battery case, and false signals to the apparatus are thereby prevented.

It will be understood that various changes in the details, materials and arrangement of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a nonlegal technical statement of the contents of the disclosure in compliance with the Rules of Practice of the United States Patent Office, and is not intended to limit the scope of the invention described and claimed herein.

What is claimed is:

1. Automatic leak testing apparatus for leak testing battery cells in batteries having different longitudinal dimensions by periodically coupling and decoupling a nozzle assembly with said battery cells and introducing a predetermined amount of gas into said battery cells and monitoring the gas pressure in said cells, said apparatus comprising:
   (a) a nozzle assembly movable to mate with at least one cell outlet of a battery,
   (b) first conveyor means for longitudinally advancing said batteries, including a position for coupling said nozzle assembly to one of said batteries,
   (c) sensing means for determining the longitudinal advancement of one of said batteries along said first conveyor means,
   (d) stop means for isolating said one of said batteries and precluding the remainder of said batteries from interfering with the testing process, said stop means acting in response to the determination of said sensing means,
   (e) means for sensing the longitudinal dimension of said one of said batteries, and
   (f) said stop means thereby moving said one of said batteries to said position for coupling said nozzle assembly to one of said batteries in automatic response to said means for sensing the longitudinal dimension of said one of said batteries.

2. The invention of claim 1 wherein said means for sensing the longitudinal dimension of said one of said batteries further comprises a plurality of sensors spaced at preselected positions with respect to said stop means, and wherein said means for moving said one of said batteries comprises a plurality of double acting cylinders having pistons therein with piston rods connected thereto, said double acting cylinders acting in response to said sensors to reposition said stop means, at least one of said piston rods being connected to said stop means.

3. The invention of claim 1 wherein said apparatus further comprises sensing means for determining the presence of said one of said batteries in said position for coupling said nozzle assembly to one of said batteries and for causing said nozzle assembly to mate with at least one cell outlet of said one of said batteries.

4. Automatic leak testing apparatus for open top battery cases having a plurality of cells defined therein, said apparatus comprising:
   (a) a resilient template assembly movable to sealingly mate with the top of said open battery case, said templete assembly having defined therein slot means for providing fluid communication to each of said cells, said slot means being of sufficient length to provide said fluid communication;
   (b) means for introducing a predetermined amount of gas into said cells through said template assembly, said template assembly being readily interchangeable and resiliently attached to said gas introducing means;
   (c) meter means for monitoring the gas pressure in said cells, and
   (d) reject means, operable in response to said meter means, for isolating leaky battery cases.

5. The invention of claim 4 wherein said template assembly further comprises a rigid plate and a resilient pad, said pad being adapted to form a seal between said template assembly and the outer walls of said case.

6. Automatic leak testing apparatus for batteries, comprising:
   (a) a nozzle assembly movable to mate with at least one cell outlet of a battery;
   (b) means for introducing a predetermined amount of gas into said cell through said nozzle assembly;
   (c) first conveyer means for longitudinally advancing said batteries, including a position for coupling said nozzle assembly to one of said batteries;
   (d) sensing means for determining the longitudinal advancement of one of said batteries along said first conveyer means;
   (e) stop means for isolating said one of said batteries and precluding the remainder of said batteries from interfering with the testing process, said stop means acting in response to the termination of said sensing means for determining the longitudinal advancement of one of said batteries;
   (f) means for sensing the longitudinal dimension of said one of said batteries;
   (g) means for moving said one of said batteries to said position for coupling said nozzle assembly to one of said batteries in automatic response to said means for sensing the longitudinal dimension of said one of said batteries;
   (h) sensing means for determining the presence of one of said batteries in said position for coupling said nozzle assembly to one of said batteries and for causing said nozzle assembly to mate with at least one cell outlet of said batteries; and
   (i) a mating sensor means of said nozzle assembly for determining the mating of said nozzle assembly with said one of said batteries, and for activating said means for introducing a predetermined amount of gas in response thereto.

7. The invention of claim 6 wherein said apparatus further comprises meter means for monitoring the gas pressure in said cell, and a reject mechanism operatable in response to said meter means for isolating leaky batteries.

8. The invention of claim 7 wherein said apparatus further comprises manifold sensing means for sensing the complete disengagement of said nozzle assembly from one of said batteries and for causing said stop means to allow the longitudinal advancement of said batteries along said first conveyor means.

9. The invention of claim 7 wherein said reject mechanism, operable in response to said meter means, for isolating leaky batteries, comprises second conveyer means, and means responsive to said meter means, for moving leaky batteries from said first conveyer means, and transferring said leaky batteries to said second conveyer means, said means for removing comprising:
   (a) a first cable loop over a set of pulleys, said loop operable in response to said meter means, and a second cable loop over a set of wheels and connected to at least one point to said first cable loop by a link;

(b) a push member connected to said first cable loop, said meter means energizing motion of said first cable loop whereby said push member moves a leaky battery to said second conveyer means; and (c) first and second limit switches positioned to contact said link when said push member is at said first conveyer means and said second conveyer means respectively to indicate movement of said push member between said first and said second conveyer means.

10. Automatic leak testing apparatus for leak testing open topped battery cases having a plurality of cells defined therein and comprising means for introducing a predetermined amount of gas into said cells through a template assembly, meter means for monitoring the gas pressure in said cells and reject means, operable in response to said meter means, for isolating leaky battery cases, said apparatus further comprising: said template assembly movable to mate with the top of said open battery case, said template assembly having defined therein slot means for providing fluid communication between each of said cells and said gas introducing means, said template assembly comprising a rigid plate and a resilient pad, said pad being adapted to form a seal between said template assembly and the outer walls of said case, said resilient pad having a slot defined therein of sufficient length to span the intercellular partitions of said battery case.

11. The invention of claim 10 wherein said plate has a slot defined therein complementally configured to the slot defined in said pad.

12. In an automatic leak testing apparatus for battery cells having a nozzle assembly movable to mate with at least one cell outlet of a battery, the improvement comprising: reversible template assembly for forming a seal between said nozzle assembly and said cell outlet of a battery, said template means assembly comprising a plate having two complementally configured resilient pads attached to the surfaces thereof, said plate and said pad having openings defined therein adapted to mate with said nozzle assembly and with the cell outlet of the battery to be tested, said template means being attached to said nozzle assembly for movement therewith by a spring means for biasing said template against said nozzle assembly to form a seal therewith.

13. The invention of claim 12 wherein said plate is substantially planar, and wherein said template assembly is symmetrical with respect to the plane bisecting said plate, whereby said template assembly may be reversed with respect to said nozzle assembly and said cell outlets to extend the wear thereof.

14. The invention of claim 13 wherein said spring means further comprises at least one spring attached to spring pins disposed on said template assembly, and wherein said nozzle assembly further comprises at least one spring pin adapted to engage said spring, whereby said template means is baised against said nozzle assembly.

* * * * *